(12) United States Patent
Haynes

(10) Patent No.: US 9,917,738 B2
(45) Date of Patent: Mar. 13, 2018

(54) INTELLIGENT DEVICE DATA ROUTER

(71) Applicant: Accenture Global Services Limited, Dublin (IE)

(72) Inventor: Justin H. Haynes, Austin, TX (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 215 days.

(21) Appl. No.: 14/596,030

(22) Filed: Jan. 13, 2015

(65) Prior Publication Data

US 2016/0204988 A1 Jul. 14, 2016

(51) Int. Cl.
*G06F 15/16* (2006.01)
*H04L 12/24* (2006.01)
*H04L 29/08* (2006.01)

(52) U.S. Cl.
CPC .......... *H04L 41/0893* (2013.01); *H04L 67/02* (2013.01); *H04L 41/0816* (2013.01)

(58) Field of Classification Search
CPC ............................ H04L 41/0893; H04L 67/02
See application file for complete search history.

(56) References Cited

U.S. PATENT DOCUMENTS

| | | | | |
|---|---|---|---|---|
| 5,664,093 A * | 9/1997 | Barnett | ................. | G06F 11/142 706/45 |
| 6,351,775 B1 * | 2/2002 | Yu | ....................... | H04L 67/1008 370/237 |
| 6,845,503 B1 * | 1/2005 | Carlson | ..................... | G06F 8/65 717/166 |
| 7,127,743 B1 * | 10/2006 | Khanolkar | ............ | G06F 21/552 709/223 |
| 8,458,301 B1 * | 6/2013 | Andrus | ............... | H04L 41/0816 709/220 |
| 8,838,748 B2 * | 9/2014 | Nair | ............................. | 709/203 |

(Continued)

OTHER PUBLICATIONS

Wikipedia Contributors, "Security information and event management", Wikipedia: The Free Encyclopedia, Wikimedia Foundation, Inc., <http://en.wikipedia.org/wiki/Security_information_and_event_management>, last accessed Jan. 11, 2015.

(Continued)

*Primary Examiner* — Ario Etienne
*Assistant Examiner* — Blake Rubin
(74) *Attorney, Agent, or Firm* — Mannava & Kang, P.C.

(57) ABSTRACT

Examples of the disclosure enable messages, such as syslog messages, rsyslog messages, and/or syslog-ng messages, to be efficiently and effectively routed. In some examples, it is determined whether a transmitting device associated with a message is associated with one or more device classes. Upon determining that the transmitting device is not associated with one or more device classes, the transmitting device is associated with a device class, and a rule set for determining whether the transmitting device is associated with one or more device classes is updated. A recipient for the message is identified, such that the message is configured to be accurately routed to the recipient. Examples of the disclosure manage messages to increase system functionality, increase speed, conserve memory, reduce processor load, increase communication reliability, and/or reduce communication error rate.

9 Claims, 5 Drawing Sheets

(56) References Cited

U.S. PATENT DOCUMENTS

| | | | |
|---|---|---|---|
| 8,863,096 B1* | 10/2014 | Bucur | G06F 11/3604 |
| | | | 717/124 |
| 9,166,989 B2* | 10/2015 | Huang | G06F 21/552 |
| 9,262,253 B2* | 2/2016 | Jain | G06F 11/0736 |
| 9,306,806 B1* | 4/2016 | Zhang | H04L 41/0866 |
| 9,306,962 B1* | 4/2016 | Pinto | H04L 63/1416 |
| 9,311,387 B1* | 4/2016 | Saurabh | G06F 17/271 |
| 9,331,916 B1* | 5/2016 | Kolman | H04L 43/04 |
| 9,420,002 B1* | 8/2016 | McGovern | H04L 63/10 |
| 2003/0079019 A1* | 4/2003 | Lolayekar | H04L 67/1097 |
| | | | 709/226 |
| 2003/0188189 A1* | 10/2003 | Desai | H04L 63/145 |
| | | | 726/23 |
| 2004/0025173 A1* | 2/2004 | Levonai | G06F 11/0748 |
| | | | 719/328 |
| 2005/0004942 A1* | 1/2005 | Madsen | H04L 41/0843 |
| 2006/0092861 A1* | 5/2006 | Corday | H04L 41/0213 |
| | | | 370/256 |
| 2007/0060169 A1* | 3/2007 | Johansson | H04L 12/5692 |
| | | | 455/453 |
| 2009/0007101 A1* | 1/2009 | Azar | G06F 9/4881 |
| | | | 718/1 |
| 2009/0119307 A1* | 5/2009 | Braun | G06F 17/30964 |
| 2009/0262741 A1* | 10/2009 | Jungck | H04L 29/12066 |
| | | | 370/392 |
| 2010/0161652 A1* | 6/2010 | Bellare | G06F 17/3028 |
| | | | 707/769 |
| 2011/0161409 A1* | 6/2011 | Nair | G06F 8/38 |
| | | | 709/203 |
| 2011/0280157 A1* | 11/2011 | Suerbaum | H04L 41/0663 |
| | | | 370/255 |
| 2011/0288692 A1* | 11/2011 | Scott | G06F 21/55 |
| | | | 700/297 |
| 2011/0314148 A1* | 12/2011 | Petersen | G06F 11/3476 |
| | | | 709/224 |
| 2012/0254337 A1* | 10/2012 | Fake | G06F 11/3068 |
| | | | 709/207 |
| 2012/0254416 A1* | 10/2012 | Fake | G06F 9/542 |
| | | | 709/224 |
| 2013/0117847 A1* | 5/2013 | Friedman | H04L 63/102 |
| | | | 726/22 |
| 2013/0170348 A1* | 7/2013 | Luna | H04L 47/20 |
| | | | 370/230.1 |
| 2013/0291087 A1* | 10/2013 | Kailash | H04L 63/1425 |
| | | | 726/11 |
| 2014/0007222 A1* | 1/2014 | Qureshi | G06F 21/10 |
| | | | 726/16 |
| 2014/0052849 A1* | 2/2014 | Sabin | H04L 43/10 |
| | | | 709/224 |
| 2014/0075519 A1* | 3/2014 | Porras | H04L 63/107 |
| | | | 726/4 |
| 2014/0096181 A1* | 4/2014 | Rivers | G06F 21/552 |
| | | | 726/1 |
| 2014/0280910 A1* | 9/2014 | Swig | H04L 45/308 |
| | | | 709/224 |
| 2014/0359131 A1* | 12/2014 | Seed | H04L 47/125 |
| | | | 709/226 |
| 2015/0106867 A1* | 4/2015 | Liang | H04L 63/1433 |
| | | | 726/1 |
| 2015/0234869 A1* | 8/2015 | Chan | G06F 17/30312 |
| | | | 707/603 |
| 2015/0269383 A1* | 9/2015 | Lang | G06F 21/57 |
| | | | 726/1 |
| 2015/0281339 A1* | 10/2015 | Strassner | G06F 9/505 |
| | | | 709/224 |
| 2016/0044054 A1* | 2/2016 | Stiansen | H04L 63/1416 |
| | | | 726/24 |
| 2016/0091912 A1* | 3/2016 | Stanlake | G05F 1/66 |
| | | | 700/295 |
| 2016/0112287 A1* | 4/2016 | Farmer | H04L 63/00 |
| | | | 709/224 |
| 2017/0032035 A1* | 2/2017 | Gao | G06F 17/30864 |
| 2017/0054738 A1* | 2/2017 | Avidan | G06F 21/566 |

OTHER PUBLICATIONS

Wikipedia Contributors, "Security information management", Wikipedia: The Free Encyclopedia, Wikimedia Foundation, Inc., <http://en.wikipedia.org/wiki/Security_information_management>, last accessed Jan. 11, 2015.

Wikipedia Contributors, "Security event manager", Wikipedia: The Free Encyclopedia, Wikimedia Foundation, Inc., <http://en.wikipedia.org/wiki/Security_event_manager>, last accessed Jan. 11, 2015.

Wikipedia Contributors, "Syslog", Wikipedia: The Free Encyclopedia, Wikimedia Foundation, Inc., <http://en.wikipedia.org/wiki/Syslog>, last accessed Jan. 11, 2015.

* cited by examiner

INTELLIGENT DEVICE DATA ROUTER

BACKGROUND

Network traffic and data generated and received by enterprises are sent through various intermediary devices including to and from public networks, such as the Internet. For example, routers, firewalls, intrusion detection devices, load balancers, virtual machine hosts, and other equipment produce and/or handle a significant amount of network traffic.

Network devices communicate information as to what traffic is seen by the network devices and how the network devices handle the traffic. Syslog and related technologies provide an established messaging protocol for communicating the network information that the various devices handle, which is logged for subsequent data analysis. As an example, SIEM (Security Information and Event Management) refers to a technology that includes a number of tools to process such data. Enterprises use SIEM to detect problems in their datacenter and network, particularly those related to potential or actual security breaches. However, there are many thousands of device vendors, and each vendor may send messages that are not necessarily consistent with respect to identifying the vendor or source device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the disclosure enable one or more messages to be routed. Some examples include a message transmission component that determines whether a transmitting device associated with a message is associated with one or more device classes of a plurality of device classes, and a class determination component that associates the transmitting device with a device class of the plurality of device classes, updates a rule set for determining whether the transmitting device is associated with one or more device classes, and identifies a recipient for the message.

BRIEF DESCRIPTION OF THE DRAWINGS

Examples of the disclosure are illustrated by way of example and not limited in the accompanying figures in which corresponding reference characters indicate corresponding parts throughout the drawings.

DETAILED DESCRIPTION

Examples of the disclosure enable one or more messages, such as syslog messages, to be efficiently and effectively routed. In some examples, a message is associated with a transmitting device that is not associated with one or more device classes. When the transmitting device is not associated with any device class, the transmitting device is associated with a device class, and a rule set for determining whether the transmitting device is associated with one or more device classes is updated. A recipient for the message is identified based on the associated device class, such that the message and/or future messages are accurately routed and/or routable to the recipient. The future messages are routed based on the updated rule set.

Aspects of the disclosure enable messages, including syslog messages associated with a transmitting device that is not associated with a device class, to be routed and/or managed. Rather than merely forwarding a message, an intelligent device data router logs and analyzes a plurality of messages to increase functionality of the device data router while consuming resources strategically and efficiently. The device data router may use and/or leverage a security information and event management (SIEM) connector to efficiently and effectively route and/or manage the messages. By incorporating a device data router and/or a SIEM connector in the manner described in this disclosure, some examples increase system functionality, increase speed, conserve memory, reduce processor load, increase communication reliability, and/or reduce communication error rate.

Figure 1:
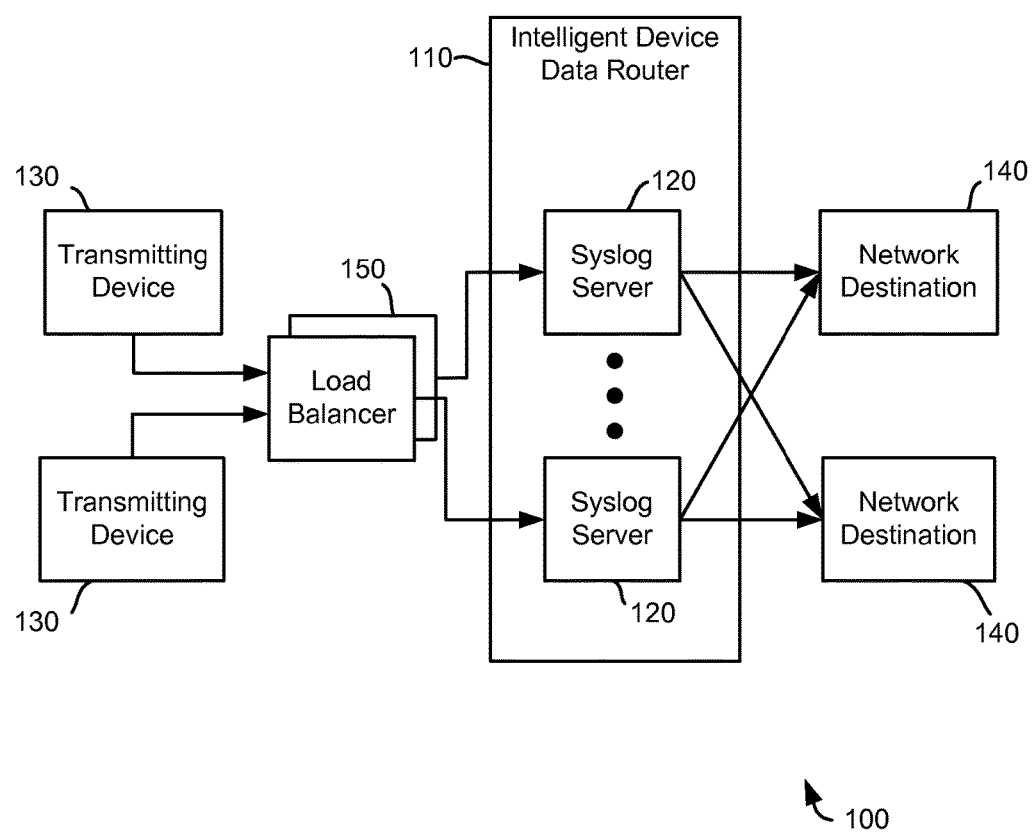
FIG. 1 is a schematic block diagram illustrating an example network system.

Referring to FIG. 1, a schematic block diagram of an example network system 100 is provided. In the example of FIG. 1, the network system 100 includes an intelligent device data router 110 including one or more computer message logging servers or syslog servers 120. Each syslog server 120 is configured to receive one or more messages from one or more transmitting devices 130, and transmit one or more messages to one or more network destinations or recipients 140. The syslog servers 120 may be configured to use and/or implement syslog technology, syslog-ng technology, and/or rsyslog technology. Additionally or alternatively, the syslog servers 120 implement any technology that enables the network system 100 to function as described herein.

In some examples, the transmitting devices 130 include network devices, enterprise servers, and the like, and the recipients 140 include loggers, monitors, security managers, providers, and the like. Additionally or alternatively, the transmitting devices 130 and/or the recipients 140 may include any entity that enables the network system 100 to function as described herein. The transmitting devices 130 may transmit messages via one or more load balancers 150 configured to distribute the messages across multiple syslog servers 120. Additionally or alternatively, the transmitting devices 130 may transmit messages directly to the syslog servers 120.

Figure 2:
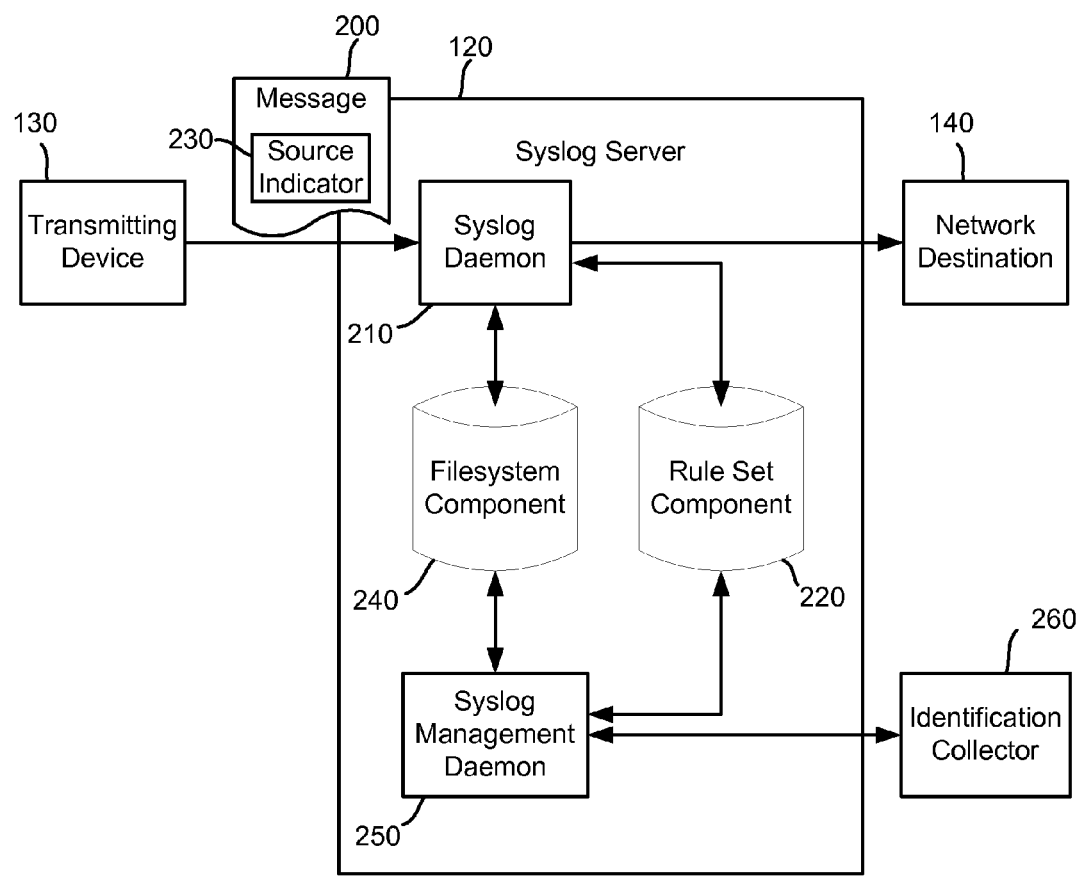
FIG. 2 is a schematic block diagram illustrating an example syslog server that may be used with a network system, such as shown in FIG. 1.

FIG. 2 is a schematic block diagram of a syslog server 120 configured to process and/or route one or more messages 200 (e.g., syslog message). The syslog server 120 is configured to determine a source (e.g., transmitting device 130) of the message 200, and/or determine a destination for the message 200 (e.g., recipient 140).

The syslog server 120 includes a syslog daemon 210 configured to receive a message 200 from the transmitting device 130 and determine a recipient 140 for the message 200 based at least in part on the transmitting device 130. The syslog daemon 210 may be configured to use and/or implement syslog technology, syslog-ng technology, and/or rsyslog technology. Additionally or alternatively, the syslog daemon 210 implements any technology that enables the syslog server 120 to function as described herein.

The syslog daemon 210 is configured to retrieve and/or receive one or more configuration files and/or rule sets from a rule set component 220, and function and/or operate (e.g., determine the recipient 140) in accordance with and/or based on the one or more rule sets. The rule set may include a table that associates one or more source indicators 230 (e.g., a hostname, a device vendor, a device product, and/or a device version) with one or more device classes. For example, a first message from device vendor X, device product Y is routed to a first recipient 140, and a second message from device vendor X, device product Z is routed to a second recipient 140.

In at least some examples, the syslog daemon 210 analyzes the message 200 to identify and/or determine whether the transmitting device 130 and/or a source indicator 230 associated with the transmitting device 130 is associated with one or more device classes according to and/or based on the rule set. In at least some examples, the syslog daemon 210 identifies a source indicator 230, and refers to the table that associates source indicators 230 with device classes to identify a device class associated with the identified source indicator 230. The source indicator 230 may be identified by parsing a hostname associated with the transmitting device 130 (e.g., <hostname>.<second-level domain>.com>) and/or a file name of the message 200 (e.g., <hostname>.log). Additionally or alternatively, the source indicator 230 may be determined and/or identified by parsing the contents of the message 200, identifying a style and/or format of the message 200, and/or parsing metadata.

The syslog daemon 210 is configured to identify and/or determine the recipient 140 according to and/or based on a rule set, such that the message 200 and/or future messages are accurately routed to the recipient 140. The rule set may include a table that associates one or more device classes with one or more recipients 140. In at least some examples, the syslog daemon 210 identifies a device class, and refers to the table that associates device classes with recipients 140 to identify a recipient 140 associated with the identified device class. In at least one example, the message 200 is routed to the recipient 140.

In some examples, the syslog daemon 210 is configured to generate one or more text-based log files including a log entry for each message 200. A logrotate function may be executed to generate one or more text-based log files, and the log file is copied to <hostname>.log-YYYYMMDD, wherein Y is the year, M is the month, and D is the date of when the logrotate function was executed. Additionally or alternatively, the text-based log files may have any format and/or be generated in any manner than enables the syslog server 120 to function as described herein.

The syslog daemon 210 is configured to transmit the log files to a filesystem component 240, wherein the log file is stored for at least a limited amount of time, and wherefrom a syslog management daemon 250 retrieves one or more log files. Additionally or alternatively, the syslog daemon 210 transmits the log file directly to the syslog management daemon 250.

The syslog management daemon 250 is configured to identify and/or analyze the log files, and automatically write and/or update the rule set for determining whether the transmitting device 130 is associated with one or more devices classes based on the analyzed log files, such that the syslog daemon 210 is configured to accurately route one or more messages 200. The syslog management daemon 250 may be internal to the syslog server 120 (as shown in FIG. 2), external to the syslog server 120 (not shown), or both (not shown). The syslog management daemon 250 may be configured to use and/or implement syslog technology, syslog-ng technology, and/or rsyslog technology. Additionally or alternatively, the syslog management daemon 250 implements any technology that enables the syslog server 120 to function as described herein.

The syslog management daemon 250 is configured to spider and/or search through the filesystem component 240 for one or more log files, extract and/or identify one or more source indicators 230 that the syslog daemon 210 has previously identified and/or processed, compare the one or more identified source indicators 230 with the table that associates source indicators 230 with device classes, and identify and/or determine whether the source indicator 230 is associated with a device class.

The syslog management daemon 250 may be configured to skip and/or ignore log entries associated with a source indicator 230 that enables a recipient 140 to be determined for a message 200 associated with the log entry (e.g., the source indicator 230 is associated with a device class in the table that associates source indicators 230 with device classes). In at least some examples, a recipient 140 is not determinable based on an existing rule set because the log entry is not associated with a source indicator 230, the existing rule set does not associate the source indicator 230 with a device class, and/or the existing rule set does not associate the device class with a recipient 140.

The syslog management daemon 250 is configured to consult and/or refer to an identification collector 260 to associate a source indicator 230 with the log entry, associate a device class with the source indicator 230, and/or associate a recipient 140 with the device class, such that the syslog daemon 210 is configured to determine a recipient 140 for the message 200 associated with the log entry. In at least some examples, the syslog management daemon 250 generates a question that enables a recipient 140 to be determined for the message 200 associated with the log entry, and transmits the question to the identification collector 260. In at least one example, the question includes at least a portion and/or sample (e.g., approximately 10-100 lines) of the log entry.

In some examples, the syslog management daemon 250 is configured to periodically (e.g. hourly) search through the filesystem component 240 and/or transmit the question to the identification collector 260. The syslog management daemon 250 may batch a plurality of questions in a list of log samples, and transmit the batched questions to the identification collector 260. Additionally or alternatively, the syslog management daemon 250 may search through the filesystem component 240 and/or transmit questions to the identification collector 260 on-demand and/or under any schedule that enables the syslog server 120 to function as described herein.

In some examples, the identification collector 260 is configured to generate and/or determine a response to the question that enables a recipient 140 to be determined for the message 200 associated with the log entry. The identification collector 260 may be external to the syslog server 120 (as shown in FIG. 2), internal to the syslog server 120 (not shown), or both (not shown). In some examples, the identification collector 260 is a SIEM (Security Information and Event Management) platform configured to use and/or implement syslog technology, syslog-ng technology, and/or rsyslog technology. Additionally or alternatively, the identification collector 260 implements any technology that enables the syslog server 120 to function as described herein.

In some examples, the identification collector 260 is configured to receive the list of log samples, and associate one or more log samples with a source indicator 230 (e.g., a hostname, a device vendor, a device product, and/or a device version) that enables a recipient 140 to be determined for the message 200 associated with the log sample. In some examples, the identification collector 260 is configured to parse the log samples to identify one or more components, and compare each component with the rule set for determining whether the transmitting device 130 is associated with one or more device classes. Based on the comparison, in at least some examples, the identification collector 260 determines and/or identifies one or more source indicators 230 and associates the one or more source indicators 230 with the log sample. In at least some examples, the identification collector 260 transmits the parsed log samples and/or the one or more source indicators 230 to the syslog management daemon 250. In at least some examples, the identification collector 260 generates and/or determines a plurality of responses to a plurality of questions identifying one or more source indicators 230 associated with each respective log sample.

In at least some examples, the syslog management daemon 250 receives the parsed log samples and/or the one or more source indicators 230, and compares the parsed log samples and/or the source indicators 230 with the rule set (e.g., the table that associates source indicators 230 with device classes). In some examples, the syslog management daemon 250 is configured to generate and/or update one or more rule sets based on the parsed log samples and/or the one or more source indicators 230.

The syslog management daemon 250 may begin to listen for responses from the identification collector 260 after transmitting the questions to the identification collector 260 and continuously listen for responses from the identification collector 260 for a configurable amount of time (e.g., five minutes) after the latest response is received. Additionally or alternatively, the syslog management daemon 250 may listen for responses from the identification collector 260 on-demand and/or under any schedule that enables the syslog server 120 to function as described herein.

In some examples, the syslog management daemon 250 is configured to maintain a tally and/or count of device classes for each source indicator 230 received from the identification collector 260, and determine a device class for each source indicator 230 based on the respective count. In at least some examples, the counts are stored in a datastructure where each item includes a list such as:

[hostname, [DEVICE_CLASS, number_of_votes]].

In at least one example, an "UNKNOWN" device class loses to any other device class unless no other device class is identified, and a generic device class (e.g., "UNIX") loses to any other device class other than "UNKNOWN". That is, when a source indicator 230 is associated with one or more counts of an "UNKNOWN" device class and no counts of any other device class, the device class associated with the source indicator 230 is the "UNKNOWN" device class. Similarly, when a source indicator 230 is associated with one or more counts of a generic device class and no counts of any other device class (other than "UNKNOWN"), the device class associated with the source indicator 230 is the generic device class. When any other device class is associated with the source indicator 230, in at least some examples, a simple majority wins. When there is a tie between device classes, in at least one example, the device class associated with the first-in-time message 200 wins. That is, when a source indicator 230 is associated with an equal number of counts for a first device class and a second device class, the device class associated with the message 200 received first in time wins. Additionally or alternatively, the syslog management daemon 250 may use any count mechanism that enables the syslog server 120 to function as described herein.

The syslog management daemon 250 is configured to generate a metarule as the parsed log samples and the source indicators 230 are compared with the rule set. For example, each entry of the metarule may include a list:

[hostname, DEVICE_CLASS]

In some examples, the syslog management daemon 250 is configured to identify and/or determine one or more recipients 140 based on the device class, and append the one or more recipients 140 to the metarule. For example, each entry of the metarule may include a list:

[hostname, DEVICE_CLASS, [destination1, destination 2, destination3 . . . ]]

The syslog management daemon 250 may use the source indicator 230 (e.g., hostname) as the key to map the metarules with the rule set. In at least some examples, the rule set is written and/or updated based on the metarules. The syslog management daemon 250 may collate the metarules, such that duplicates are removed and a unique set of rules are written.

The syslog management daemon 250 is configured to transmit the updated rule set to one or more rule set components 220 in the network system 100. In at least some examples, the syslog management daemon 250 controls (e.g., restarts) the syslog daemon 210, such that the updated rule set is read and syslog daemon 210 processes one or more messages 200 in accordance with the updated rule set. Communications to or from each network system 100 component may be done via a secure method of file transfer, such as secure copy (SCP) with a public/private key authentication and/or a functional account on the syslog server 120.

It should be understood that any examples, data structures, techniques and so forth described herein are non-limiting examples. As one example, the technology described herein may be applied to solutions that use any network communications and/or logging protocol, of which syslog is only one example. As such, the present technology is not limited to any particular example implementations, aspects, concepts, structures, functionalities or examples described herein. Rather, any of the example implementations, aspects, concepts, structures, functionalities or examples described herein are non-limiting, and the present technology may be used in various ways that provide benefits and advantages in computing and network devices in general.

Figure 3:
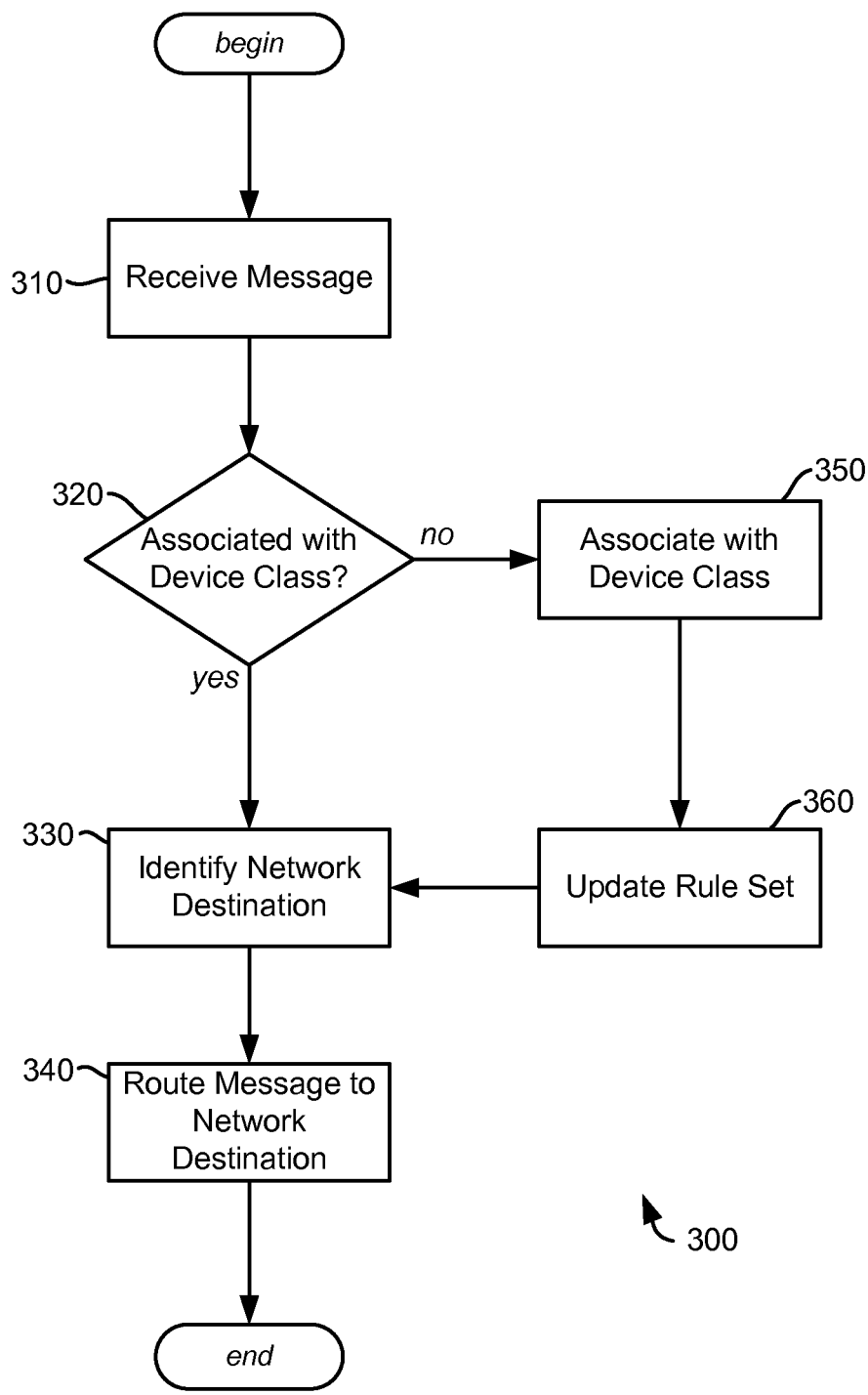
FIG. 3 is a flow chart illustrating an example operation of a syslog server, such as shown in FIG. 2, for routing one or messages.

FIG. 3 is a flow chart illustrating a method 300 for routing one or messages in the network system (shown in FIG. 1). The operations illustrated in FIG. 3 may be executed by any computing device (e.g., see computing device 500 in FIG. 5). The operations may be executed by the syslog server 120.

In this example, a message 200 associated with a transmitting device 130 is received at 310. Based on the received message 200, it is determined at 320 whether the transmitting device 130 is associated with one or more device classes. When the transmitting device 130 is associated with one or more device classes according to an existing rule set, in this example, a recipient 140 is identified at 330 based on the one or more associated device classes, and the message 200 is routed at 340 to the recipient 140.

When the transmitting device 130 is not associated with any device class according to the existing rule set, in this example, the transmitting device 130 is associated at 350 with one or more device classes. In at least some examples, an identification collector 260 is consulted to identify one or more source indicators 230 associated with the transmitting device 130. In at least one example, a question associated with the transmitting device 130 is transmitted to the identification collector 260, and a response to the question is received from the identification collector 260. In at least some examples, one or more device classes are identified and/or determined based on the response.

In at least some examples, a rule set for determining whether the transmitting device 130 is associated with one or more device classes is updated at 360. In at least one example, a syslog daemon 210 is restarted, such that the updated rule set is read and subsequent (e.g., future) messages 200 are processed in accordance with the updated rule set.

Figure 4:
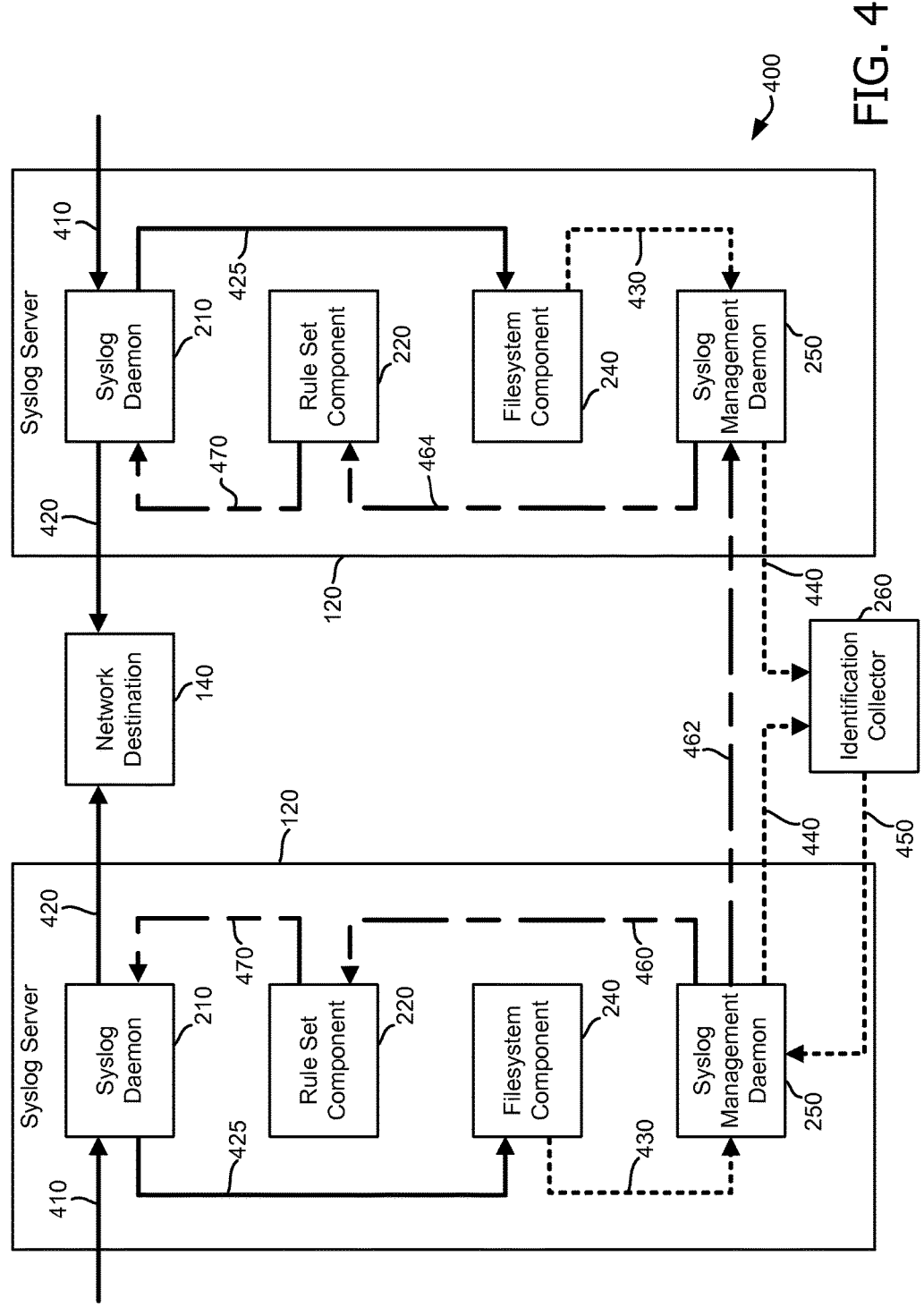
FIG. 4 is a schematic block diagram illustrating an example operation, such as shown in FIG. 3, for routing one or messages using an example syslog server, such as shown in FIG. 2.

FIG. 4 is a schematic block diagram illustrating an example operation 400 for the syslog server 120 to route one or messages 200 (e.g., log file) to a recipient 140. In this example, one or more messages 200 (shown in FIG. 2) are received at 410 by a syslog server 120, and routed at 420 to a recipient 140 based on a source indicator 230 (shown in FIG. 2) associated with a transmitting device 130 (shown in FIG. 1). In this example, a log entry (e.g., log file) is written at 425 to a filesystem component 240 for at least a limited amount of time. In this example, a solid line is associated with a log file. Additionally or alternatively, the solid line may be associated with any type of file that enables the syslog server 120 to function as described herein.

In this example, a syslog management daemon 250 periodically (e.g., hourly) searches through one or more log entries stored in filesystem component 240, and retrieves at 430 at least a portion of one or more log entries (e.g., log samples) associated with source indicators 230 not yet associated with a device class and/or a transmitting device 130. In this example, the syslog management daemon 250 transmits at 440 the portions of the one or more log entries (e.g., log samples) to an identification collector 260 to identify and/or determine a source indicator 230. In at least one example, the syslog management daemon 250 spiders /opt/logs/*.*.log for hostnames, reads each hostname rule from /rsyslog.d, and transmits the difference to the identification collector 260.

In some examples, the identification collector 260 parses the portions of the one or more log entries (e.g., log samples) to identify and/or determine one or more source indicators 230 based at in least in part on the parsed portions. In some examples, the identification collector 260 determines one or more source indicators 230 and stores the one or more source indicators 230 in the log entry and/or appends them to the log entry. In this example, the syslog management daemon 250 receives at 450 one or more log entries (e.g., log samples) back with the source indicators 230, and identifies and/or determines a device class based on the source indicator 230. In this example, a short-dashed line is associated with a sample of a log file or a log sample. Additionally or alternatively, the short-dashed line may be associated with any type of file that enables the syslog server 120 to function as described herein.

In this example, the syslog management daemon 250 determines one or more new and/or updated rule sets, and transmits at 460 the updated rule sets to a rule set component 220 to update the existing rule set. In at least one example, the syslog management daemon 250 generates a metarule based on input from the identification collector 260 (e.g., log samples and/or source indicators 230) and lookups in tables (e.g., device vendor/device product-to-device class and/or device class-to-destination). In at least some examples, the syslog management daemon 250 backs up the existing rule set, and transmits at 462 the updated rule set to another syslog management daemon 250, such that the other syslog management daemon 250 is configured to transmit at 464 the updated rule set to a rule set component 220 associated with the other syslog management daemon 25.

In this example, the syslog daemon 210 retrieves at 470 the updated rule set and restarts to read the updated rule set, such that the syslog daemon 210 operates in accordance with the updated rule set. In this example, a long-dashed line is associated with a configuration file and/or rule set. Additionally or alternatively, the long-dashed line may be associated with any type of file that enables the syslog server 120 to function as described herein.

Figure 5:
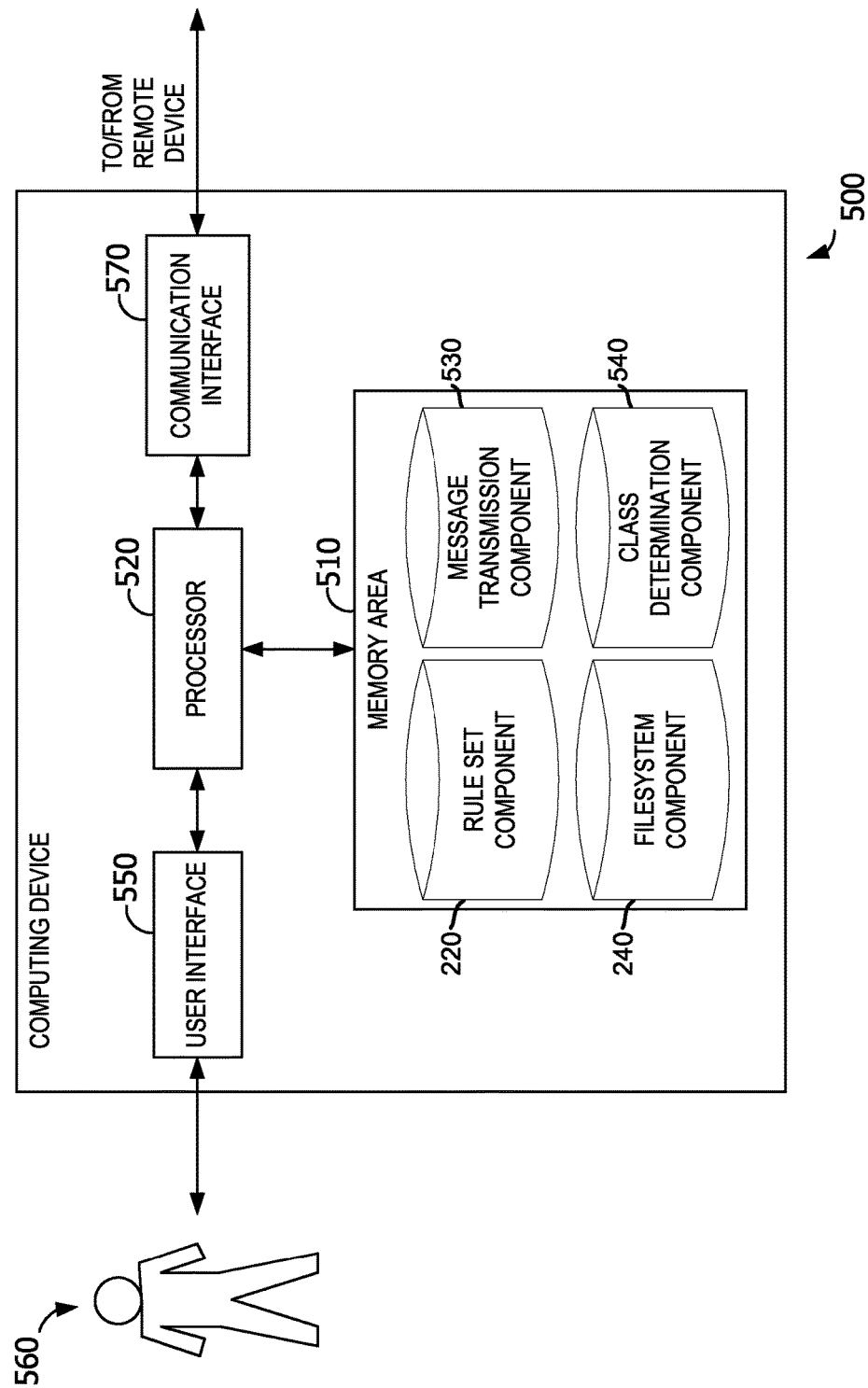
FIG. 5 is a schematic block diagram illustrating an example computing environment in which various aspects of the present technology may be incorporated.

FIG. 5 is a block diagram illustrating an example computing environment in which various aspects of the present technology may be incorporated. In this example, a computing device 500 includes one or more computer-readable media, such as a memory area 510 storing computer-executable instructions, configuration files, device data, messages, log files, log samples, and/or other data, and at least one processor 520 programmed to execute the computer-executable instructions for implementing aspects of the disclosure. The memory area 510 includes any quantity of media associated with or accessible by the computing device 500. The memory area 510 may be internal to the computing device 500, external to the computing device 500, or both.

In some examples, the memory area 510 stores, among other data, one or more applications. The applications, when executed by the processor 520, operate to perform functionality on the computing device 500. Example applications include mail application programs, web browsers, calendar application programs, address book application programs, messaging programs, media applications, location-based services, search programs, and the like. The applications may communicate with counterpart applications or services such as web services accessible via a network (not shown). For example, the applications may represent downloaded client-side applications that correspond to server-side services executing in a cloud.

In this example, the memory area 510 stores one or more computer-executable components for automatically routing messages including, but not limited to, a rule set component 220, a filesystem component 240, a message transmission component 530, and/or a class determination component 540. While the rule set component 220, the filesystem component 240, the message transmission component 530, and the class determination component 540 are shown to be stored in the memory area 510, the rule set component 220, the filesystem component 240, the message transmission component 530, and/or the class determination component 540 may be stored and/or executed from a memory area remote from the computing device 500. For example, the rule set component 220, the filesystem component 240, the message transmission component 530, and/or the class determination component 540 may be stored in a cloud service, a database, or other memory area accessible by the computing device 500. Such examples reduce the computational and storage burden on the computing device 500.

The processor 520 includes any quantity of processing units, and the instructions may be performed by the processor 520 or by multiple processors within the computing device 500 or performed by a processor external to the computing device 500. In some examples, the processor 520 is programmed to execute instructions such as those illustrated in the figures (e.g., FIG. 3). Although processor 520 is shown separate from the memory area 510, examples of the disclosure contemplate that the memory area 510 may be onboard the processor 520 such as in some embedded systems.

In some examples, the processor 520 is transformed into a special purpose microprocessor by executing computer-executable instructions or by otherwise being programmed. For example, the rule set component 220 corresponds to a plurality of rule sets, configuration files, tables, and/or device data that may be determined by the processor 520, and the filesystem component 240 corresponds to a plurality of messages, log files, and/or log samples that may be determined by the processor 520. The message transmission component 530, when executed by the processor 520, causes the processor 520 to receive and/or transmit one or more messages, and determine whether a transmitting device 130 associated with a message 200 is associated with one or more device classes of a plurality of device classes based on a rule set. The class determination component 540, when executed by the processor 520, causes the processor 520 to associate the transmitting device 130 with a device class of the plurality of device classes, update a rule set for determining whether the transmitting device 130 is associated with one or more device classes, and identify a recipient 140 for the message 200, such that the message 200 is configured to be routed to the recipient 140.

In some examples, the computing device 500 includes at least one user interface 550 for exchanging data between the computing device 500 and a user 560. For example, the user interface 550 includes and/or is coupled to a presentation device (not shown) configured to present information, such as text, images, audio, video, graphics, alerts, and the like, to the user 560. The presentation device may include, without limitation, a display, a speaker, and/or a vibrating component. Additionally or alternatively, the user interface 550 includes and/or is coupled to an input device (not shown) configured to receive information, such as user commands, from the user 560. The input device may include, without limitation, a controller, a camera, a microphone, and/or an accelerometer. In at least some examples, the presentation device and the input device are integrated in a common user interface 550 configured to present information to the user 560 and receive information from the user 560. For example, the user-interface device may include, without limitation, a capacitive touch screen display and/or a controller including a vibrating component.

In some examples, the computing device 500 includes at least one communication interface 570 for exchanging data between the computing device 500 and a computer-readable media and/or another computing device. Communication between the computing device 500 and a computer-readable media and/or another computing device may occur using any protocol or mechanism over any wired or wireless connection.

The block diagram of FIG. 5 is merely illustrative of an example system that may be used in connection with one or more examples of the disclosure and is not intended to be limiting in any way. Further, peripherals or components of the computing device 500 known in the art are not shown, but are operable with aspects of the disclosure. At least a portion of the functionality of the various elements in FIG. 5 may be performed by other elements in FIG. 5, or an entity (e.g., processor, web service, server, application program, computing device, etc.) not shown in FIG. 5.

The subject matter described herein enables messages to be efficiently and effectively routed. For example, the examples of the disclosure analyze one or more messages to automatically generate logic for routing the one or messages to one or more appropriate destinations, thereby increasing functionality while consuming resources strategically and efficiently. In one implementation, an identification collector is leveraged to efficiently and effectively lookup and/or identify newly found devices and manage one or more configuration files accordingly. The subject matter described herein enable tables (e.g., device vendor/device product-to-device class table and/or device class-to-destination table) to be periodically mapped and/or maintained, performance to be monitored, and/or existing rule sets to be updated.

Example computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when configured to execute the instructions described herein.

The examples illustrated and described herein as well as examples not specifically described herein but within the scope of aspects of the disclosure constitute example means for routing messages. For example, the elements illustrated in FIGS. 1 and 2, such as when encoded to perform the operations illustrated in FIGS. 3 and 4, constitute example means for determining whether a transmitting device is associated with one or more device classes, example means for associating the transmitting device with a device class, example means for updating a rule set for determining whether the transmitting device is associated with one or more device classes, and example means for identifying a recipient for the message, such that the message is configured to be routed to the recipient.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

receive a message associated with a transmitting device;
determine whether the transmitting device associated with the message is associated with one or more device classes of a plurality of device classes;
associate the transmitting device with a device class of the plurality of device classes;
generate a question associated with the message;
transmit the question;
determine a response to the question;
receive the response to the question;
determine the device class with which the transmitting device is associated;
batch a plurality of questions;
transmit the batched plurality of questions;
determine a plurality of responses to the batched plurality of questions;
receiving the plurality of responses to the batched plurality of questions;
parse at least a portion of the message to identify one or more components;
compare each component of the one or more components with the rule set for determining whether the transmitting device is associated with one or more device classes;
determine a count associated with the message;
determine a timing associated with the message;
update the rule set for determining whether the transmitting device is associated with one or more device classes;
identify a recipient for the message, such that the message is configured to be routed to the recipient;
route the message to the recipient;
a message transmission component that determines whether a transmitting device associated with a message is associated with one or more device classes of a plurality of device classes based on a rule set; and
a class determination component that associates the transmitting device with a device class of the plurality of device classes, updates a rule set for determining whether the transmitting device is associated with one or more device classes, and identifies a recipient for the message, such that the message is configured to be routed to the recipient.

In some examples, the operations illustrated in FIGS. 3 and 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A system comprising:
a memory area storing computer-executable instructions for routing a received message; and
a processor programmed to execute the computer-executable instructions to:
generate a log entry in a log file for the received message;
based on a rule set, determine whether a transmitting device associated with the received message is associated with at least one device class of a plurality of device classes, wherein the plurality of device classes describe different types of devices;
on determining that the transmitting device is not associated with at least one device class of the plurality of device classes, the processor is to:
batch questions associated with the received message, wherein the questions include at least a portion of the log entry for the received message;
transmit the batched questions and listen for responses to the batched questions;
based on the responses, determine, by the processor, the device class of the plurality of device classes with which the transmitting device is to be associated;
associate the transmitting device with the determined device class; and update, by the processor, the rule set based upon the associated transmitting device and the determined device class;

based on the updated rule set, identify a recipient for transmitting the received message; and transmit the received message to the recipient.

2. The system of claim 1, wherein to determine the device class, the processor is further programmed to:

parse the log entry associated with the received message to identify one or more components;

compare each component of the one or more components with the rule set for determining whether the transmitting device is associated with one or more device classes; and based on the comparison, determine the device class with which the transmitting device is associated.

3. A method comprising:

receiving, at a computing device, a message associated with a transmitting device;

generating, by the computing device, a log entry in a log file for the message;

based on a rule set, determining, at the computing device, whether the transmitting device associated with the message is associated with at least one device class of a plurality of device classes, wherein the plurality of device classes describe different types of devices;

on determining that the transmitting device is not associated with at least one device class of the plurality of device classes, the method, executed by the computing device, includes:

batching questions associated with the message, wherein the questions include at least a portion of the log entry for the message;

transmitting the batched questions and listening for responses to the batched questions;

based on the responses, determining the device class of the plurality of device classes with which the transmitting device is to be associated;

associating the transmitting device with the determined device class; and updating, by the computing device, the rule set based upon the associated transmitting device and the determined device class;

based on the rule set, identifying a recipient for transmitting the message; and transmitting the message to the recipient.

4. The method of claim 3, wherein determining the device class of the plurality of device classes comprises:

determining a count associated with the message; and based on the count, determining the device class with which the transmitting device is associated.

5. The method of claim 3, wherein determining the device class of the plurality of device classes comprises:

determining a timing associated with the message; and based on the timing, determining the device class with which the transmitting device is associated.

6. One or more non-transitory computer storage media embodying computer-executable components, said components comprising:

a log management component to cause a processor to generate a log entry in a log file for a received message;

a message transmission component that, when executed by the processor, causes the processor to determine whether a transmitting device associated with the received message is associated with at least one device class of a plurality of device classes based on a rule set, wherein the plurality of device classes describe different types of devices; and a class determination component that, when executed by the processor, causes the processor to, upon determining that the transmitting device is not associated with at least one device class of the plurality of device classes:

batch questions associated with the received message, wherein the plurality of questions include at least a portion of the log entry for the received message;

transmit the batched questions and listen for responses to the batched questions;

based on the responses, determine the device class of the plurality of device classes with which the transmitting device is to be associated;

associate the transmitting device with the determined device class; and update, by the processor, the rule set based upon the associated transmitting device and the determined device class;

identify, based upon the updated rule set, a recipient for transmitting the received message; and transmit the message to the recipient.

7. The computer storage media of claim 6, wherein the class determination component, when executed by the processor, further causes the processor to:

determine a count associated with the message; and based on the count, determine the device class with which the transmitting device is associated.

8. The computer storage media of claim 6, wherein the class determination component, when executed by processor, further causes the processor to:

determine a timing associated with the message; and based on the timing, determine the device class with which the transmitting device is associated.

9. The system of claim 1, wherein the rule set includes a table associating source indicators with the plurality of device classes, and wherein the processor is to:

maintain a count of device classes for each source indicator received in the responses; and determine the device class for each of the source indicators based on the count.

* * * * *

UNITED STATES PATENT AND TRADEMARK OFFICE
CERTIFICATE OF CORRECTION

PATENT NO. : 9,917,738 B2
APPLICATION NO. : 14/596030
DATED : March 13, 2018
INVENTOR(S) : Justin H. Haynes It is certified that error appears in the above-identified patent and that said Letters Patent is hereby corrected as shown below:

In the Claims

In Column 14, Line 20, Claim 6, "plurality of" should be removed.

Signed and Sealed this
Eighth Day of May, 2018

Andrei Iancu
*Director of the United States Patent and Trademark Office*